United States Patent [19]

Osborne

[11] 4,034,599
[45] July 12, 1977

[54] DEVICE FOR LOCATING DEFECTIVE FUEL

[75] Inventor: Robert N. Osborne, Alamo, Calif.

[73] Assignee: General Electric Company, San Jose, Calif.

[21] Appl. No.: 587,843

[22] Filed: June 18, 1975

[51] Int. Cl.² .................. G01M 3/20; G21C 17/06
[52] U.S. Cl. ............................ 73/40.7; 176/19 LD
[58] Field of Search ............ 73/37, 40.7; 176/19 R, 176/19 LD

[56] References Cited

U.S. PATENT DOCUMENTS

| | | | |
|---|---|---|---|
| 3,073,767 | 1/1963 | Whithan et al. | 176/19 LD X |
| 3,098,023 | 7/1963 | Schluderberg | 176/19 LD X |
| 3,234,101 | 2/1966 | Berthod | 176/19 LD |
| 3,523,868 | 8/1970 | Dady | 176/19 LD |
| 3,672,207 | 6/1972 | Cramp et al. | 73/40.7 |
| 3,878,040 | 4/1975 | Martucci | 176/19 LD |

Primary Examiner—Donald O. Woodiel
Assistant Examiner—John S. Appleman

Attorney, Agent, or Firm—Ivor J. James, Jr.; Samuel E. Turner; Sam E. Laub

[57] ABSTRACT

A method and apparatus for locating defective nuclear fuel elements is disclosed. Fuel elements that are to be tested are enclosed in a test chamber, filled with water. Air is pumped or pulled into the chamber, entering through a gas sparger at the bottom of the chamber and displacing a portion of the water above the fuel element. This reduces the pressure in the vessel, forms an air pocket above the fuel element and purges the water surrounding the fuel element of fission gases released from defective fuel elements. The activity of sample gas drawn from the chamber is continuously monitored to indicate fission gas content. In subsequent steps the pressure in the chamber is further reduced with a vacuum pump and gas drawn from the air pocket above the fuel for testing is recirculated and allowed to continuously purge the water surrounding the fuel elements of fission gases released from defective fuel elements.

11 Claims, 3 Drawing Figures

| POSITION | ORIENTATION | FUNCTION | DIRECTION of FLOW |
|---|---|---|---|
| 1 | ⊕ | Pulling Vacuum or Cleanup Air Purge | Ventilation System |
| 2 | ⊕ | Recycle | Test Chamber |

| Valve A | Valve B | Valve D | Valve E | Pump 18 |
|---|---|---|---|---|
| closed | vent | open | open | off |
| " | " | open | closed | off |
| " | " | closed | " | on |
| " | recycle | " | " | " |
| open | vent | " | open | " |
| open | vent | " | open | off |

DEVICE FOR LOCATING DEFECTIVE FUEL

BACKGROUND OF THE INVENTION

1. Field of the Invention

This invention relates to a method and apparatus for locating defective fuel elements that are used in the core of a water moderated nuclear reactor.

2. Background of the Invention

There are several methods employed in the art for detecting defective fuel elements in water moderated nuclear reactors. The two most common methods are known as wet and dry sipping. Wet sipping is based upon the leaching of fission products (primarily iodine and cesium) from defective elements into an isolated volume of coolant. In a boiling water reactor (BWR) the primary advantage of the wet sipping method is that it can be used without removing fuel from the core. This is possible since in a BWR fuel elements are arranged in bundles that are surrounded by a channel that is open at the bottom and the top. Partial isolation of the fuel is obtained by placing a loose fitting cap over the fuel channel and forcing air into the cap until the coolant water is displaced slightly below the top of the channel. After a sufficient time water samples are drawn from the capped channel and measured for the concentration of fission products. This method suffers from the disadvantage that the bottom of the fuel channel is still open and the concentration of fission products leached from the fuel is reduced by both convection and a decrease in the density of the isolated water due to reduced cooling and an increase in temperature.

Pressurized water reactors (PWR) are usually operated without fuel channels thus requiring the removal of fuel elements from the core for testing. This is accomplished by lifting the fuel elements out of the core and placing them in a sealed container filled with water. After a sufficient time, the water is tested for the presence of certain leached radioactive fission products. It has been demonstrated that the sensitivity and reliability of wet sipping is increased measurably by thus removing the fuel from the core and isolating each assembly in a sealed container. Thus, with the increasing interest in locating as many fuel defects as possible the current trend in both PWR's and BWR's is towards sipping from sealed containers. However, wet sipping in general suffers from the major disadvantage that there is a rapid decrease in leachable fission products following plant shutdown. This decrease is exponential with time and since leaching is the controlling process rather than radioactive decay, wet sipping operations must be completed within a few weeks of plant shutdown for the most reliable results.

A newer method coming into use both in PWR's and BWR's is the dry sipping method. Dry sipping depends upon the expelling of fission gases through defective fuel cladding with high decay heat temperatures. The fuel is removed from the core, placed in an open bottom cylinder and the coolant is displaced to expose the fuel elements to air and obtain the required temperature increase. When the water is allowed to re-enter the container, it expels the air which is then sampled and measured for fission gas content. Signals from dry sipping have been shown to be several orders of magnitude greater than those from wet sipping and have been readily observed several months after plant shutdown. However, dry sipping suffers from the disadvantage that overheating of the cladding surrounding the fuel element is possible.

The prior art has made attempts to improve upon the wet and dry sipping methods. Specifically, U.S. Pat. No. 3,419,467 Holzer et al. discloses a method of testing fuel elements from the core of a nuclear reactor that comprises: sealing the fuel elements in a test chamber filled with water, repeatedly changing the pressure and temperature of the water in the vessel, so as to first drive water into the fuel defects and then cause it to be expelled, rinsing the fuel elements, and measuring the concentration of fission products contained in the rinse water. Holzer et al discuss the possibility of rinsing with a gas, but it is apparent that the method they employ would be subject to the same safety consideration presented with the dry sipping technique, namely being that of overheating of the fuel cladding.

The present invention has as its main object to provide a method and apparatus for detecting failed fuel elements from either a BWR, PWR or any water moderated reactor that provides the very high, and therefore very sensitive, signal found in dry sipping with the safety of wet sipping.

SUMMARY OF THE INVENTION

The invention is based upon the recognition that pressure rather than temperature may be used to drive or pull, fission gas from defective fuel elements, thus, enabling the very high sensitivity of dry sipping to be combined with the safety of wet sipping. According to the invention, fuel elements that are to be tested, such as suspect fuel elements from the core of a nuclear reactor, are enclosed in a test chamber, filled with water. The test chamber may be located either in the reactor vessel or, at the bottom of the fuel pool. The test chamber contains an exhaust line near the top and a gas sparger at the bottom. Air is introduced into the test chamber through the gas sparger and is allowed to displace a portion of the water above the fuel element. This serves to form an air pocket above the fuel element, reduce the pressure in the test chamber, and simultaneously purge the water surrounding the fuel element of fission gases pulled from defective fuel elements. The activity of fission gases entrained in the air may then be measured by passing the air through a suitable radiation monitor. In a second step in the method, the pressure in the test chamber is further reduced, to a vacuum, so as to increase the release of fission gases. In a third step in the method, the pressure in the test chamber is held at a vacuum and gas drawn from the air pocket above the fuel for testing is recirculated so as to continuously purge the water surrounding the fuel element of released fission gases.

DESCRIPTION OF THE PREFERRED EMBODIMENT

Figure 1:
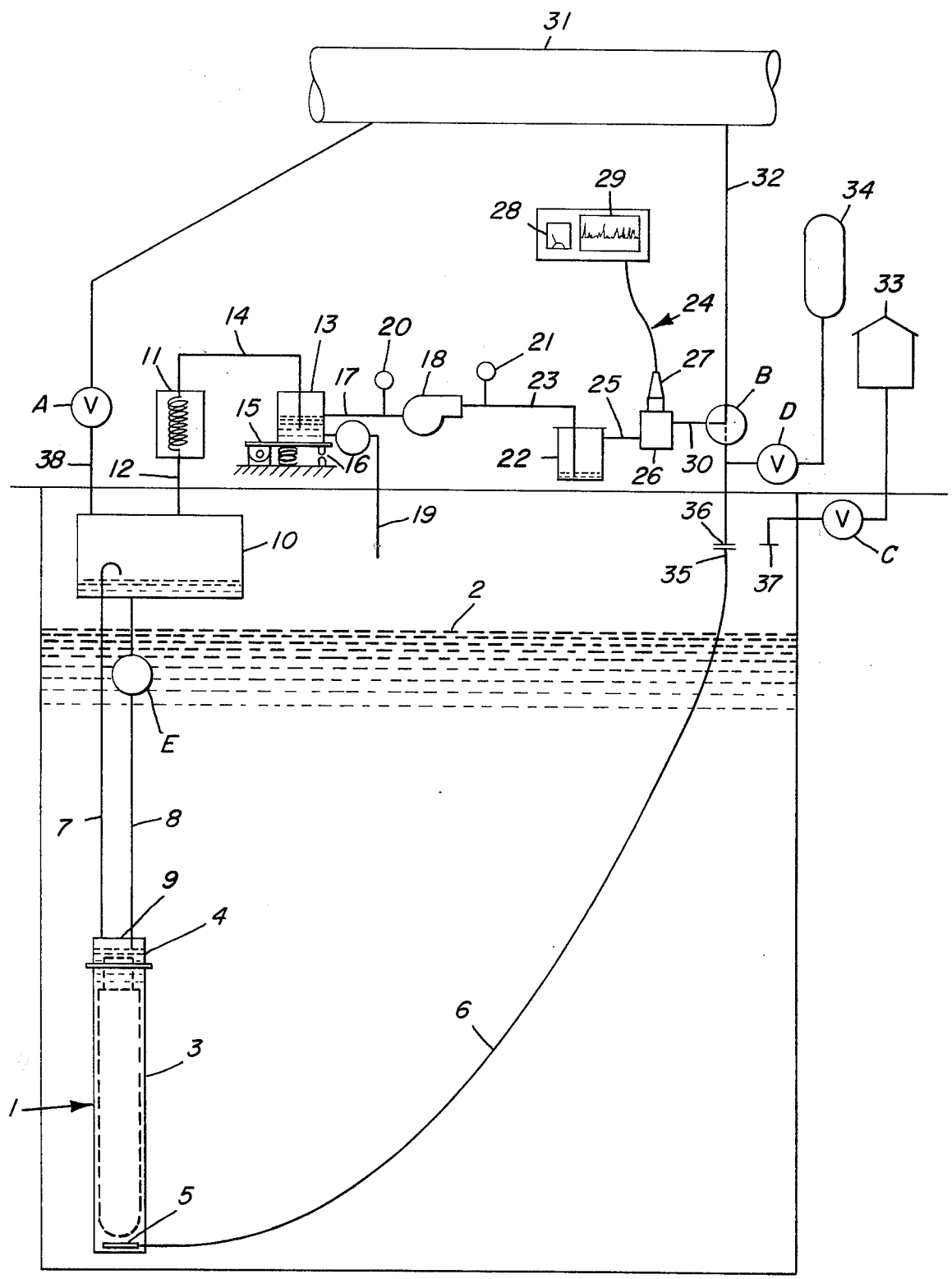
FIG. 1 is an elevation, partly in section, and schematic view of the testing apparatus.

The test apparatus of FIG. 1 depicts one embodiment of the invention that will test fuel elements removed from the core of a BWR, PWR or any water-moderated reactor. Since in this embodiment of the invention the fuel elements to be tested are to be removed from the core of the reactor, it is assumed that the test operation will be carried out during a refueling outage and apparatus such as a refueling platform and appropriate grapples and hoists for moving the fuel elements from the core of the reactor will be available. In the core of a nuclear reactor, each fuel assembly or bundle is comprised of an array of sealed reactor fuel elements which may be in the form of tubes, rods or plates. Normally, a complete fuel bundle will be tested in the apparatus here disclosed. However, for convenience the fuel bundles will hereinafter be referred to as fuel elements and it will become apparent as this description proceeds that the invention is not limited to the testing of complete fuel assemblies.

The test apparatus of FIG. 1 includes a test chamber, depicted generally by the numeral 1, located in a fuel pool 2. The test chamber 1 is comprised of a sipping can 3 and sipping can head 4 mounted thereon. Although only one sipping can 3 is depicted here, normally as many as five sipping cans are used for testing. However, only one sipping head 4 need be provided because it can be moved among the sipping cans for sequentially testing the fuel elements deposited therein. The sipping can 3 includes a gas sparger 5, disposed at the bottom of the sipping can. The gas sparger 5 serves to distribute purge air as a mass of bubbles. Return line 6 supplies air to the gas sparger 5. The sipping can head 4 is connected to sample line 7 and drain line 8. Purge air and fission gas are trapped in an air pocket 9 and are removed for monitoring through sample line 7. All lines to the sipping can 3 and sipping can head 4 are small bore rubber or plastic tubing.

The remainder of the test apparatus is located above the fuel pool or reactor vessel. Sample line 7 delivers purge air and fission gas, hereinafter referred to as sample flow or sample gas, to a reservoir 10, which is sized so as to accommodate at least twice the volume of water displaced from the air pocket 9. Sample flow is then directed to a gas chiller 11 via line 12. Use of the gas chiller 11 is not essential but it is desirable to prevent condensation of water vapor in other portions of the test apparatus. This is particularly important, during the low pressure portions of the test method and during times when the fuel pool temperature exceeds ambient temperature. Sample flow leaves the gas chiller 11 and enters a first water trap 13 via line 14. The first water trap 13 is mounted on a spring-loaded platform 15 having microswitch contacts 16 or the like that will shut off a pump indicated by the numeral 18 and open a remoteoperated valve A to vent the test apparatus if the trap 13 fills to a predetermined level with water. This safety feature will prevent the pump 18 from flooding the test apparatus in the event that the sipping can head 4 is not sealed properly for the vacuum steps of the testing method. (Water trap 13 may be emptied via a valve controlled line 19.) Sample flow exits the first water trap 13 to the low pressure side of the pump 18 via line 17.

The pump 18 should be of the type having a sealed lubricating and drive system and should be capable of pulling a vacuum and delivering pressure. An oil-lubricated vane pump may be used; however, repeated dismantling and cleaning may be required. Therefore, a diaphram-type pump is preferable. Vacuum gauge 20 and pressure gauge 21 may be included to monitor the performance of the pump 18. The vacuum gauge 20 and pressure gauge 21 are associated with the intake and output sides of the pump 18, respectively. The pump 18 exhausts to a second water trap 22 via line 23. Sample flow is then directed to a radiation detection monitor, indicated generally by the numeral 24, via line 25.

The monitor 24 is comprised of a monitor chamber 26, detector 27, count rate meter 28 and recorder 29. The volume of the monitor chamber 26 is on the order of 100ml, but may be increased or decreased depending on the sensitivity desired. A larger monitor chamber would increase the sensitivity of the monitor. The detector 27 may be a plastic Beta scintillator that is shielded with four inches of lead. The count rate meter 28 and recorder 29 may be of any type well known in the art. The recorder 29 may be a simple chart recorder that can be used to provide a written record of activity levels encountered during the test. In the present embodiment the count rate meter 28 has amplifier-discriminator circuitry of any commercially available type, associated with it that can be used to bias the monitor preferentially for the measurement of $Kr^{85}$ in the presence of $Xe^{133}$, or such that the two gases are monitored with equal efficiency. Other types of Beta sensitive detectors such as Geiger Muller detector tube may be substituted if there is no desire to monitor $Kr^{85}$ preferentially. If it is desired that $Xe^{133}$ is to be monitored preferentially a gamma sensitive detector such as a sodium iodide thalium activated crystal may be substituted. If the fuel elements to be tested recently have been used for power generation in the core of a nuclear reactor it may be desirable to preferentially monitor $Xe^{133}$; however, as time passes less of the shorter lived $Xe^{133}$ will be present and it then becomes more desirable to monitor the presence of the longer lived $Kr^{85}$.

Figures 2, 3:
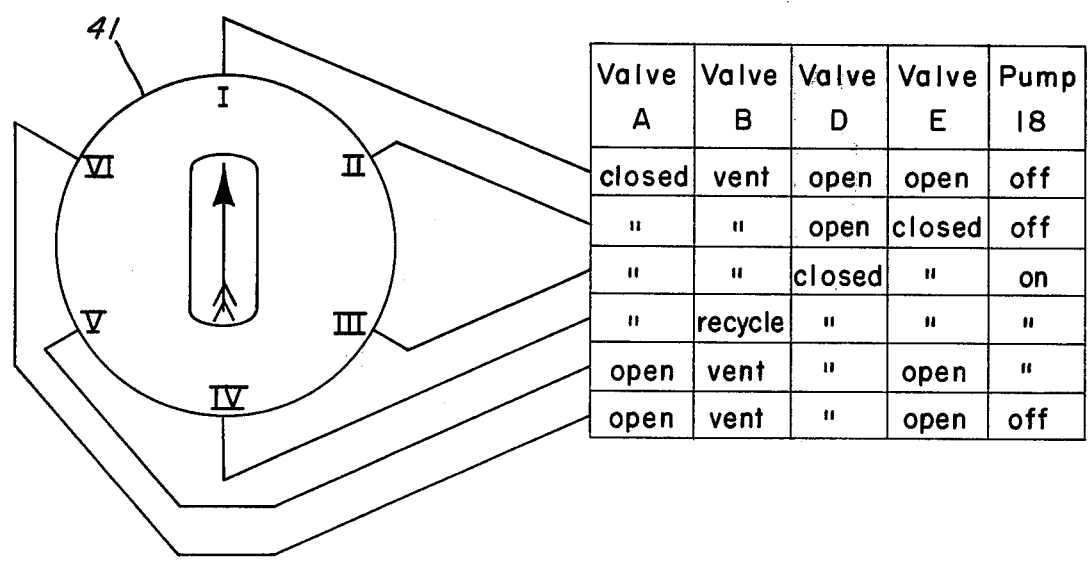
FIG. 2 is a tabular representation of the function of a two-way valve employed in the apparatus.
FIG. 3 is a partially schematic, partially tabular, representation of a six-position main control panel switch employed in the apparatus.

Sample flow leaves the monitor chamber 26 via line 30 and enters a two-way valve, designated by the letter B. Referring now also to FIG. 2, two-way valve B is used to direct sample flow in one of two directions. When in the orientation designated by position 1 in FIG. 2 two-way valve B is used to direct flow to the reactor building ventilation system 31 via line 32. When in the orientation designated by position 2 in FIG. 2 two-way valve B directs flow to return line 6 for recycle.

Referring now to FIG. 1 a supply of demineralized water 33 and pressurized air 34 is provided to facilitate cleanup and/or reduce background count rate. Access to air supply 34 and water supply 33 is obtained by moving quick disconnect coupling 35 to connections 36 and 37 respectively. The flow of air and water is controlled by remote-operated valves D and C, respectively. Also included to facilitate cleanup and removal of the sipping can head 4 is drain line 8 running from the sipping can head 4 to the reservoir 10. This line is normally sealed by a remote operated valve E. Reservoir 10 is also provided with a second vent line 38, leading to the reactor building ventilation system 31. Remote-operated valve A normally seals line 38. Manipulation of valves A and E allows air trapped in the air pocket 9 to escape and be replaced with water from the reservoir 10. As previously discussed valve A also may be opened by a signal generated by microswitch contacts 16, to vent the system and prevent accidental flooding of the test apparatus.

Referring now to FIG. 3 the numeral 41 designates a six-position central control switch which determines the mode of operation of the system by setting the position of remote-operated valves A, B, D and E and controlling the operation of pump 18. FIG. 3 also shows a tabular representation of the condition of valves A, B, D and E, and pump 18 in the several positions of the switch 41. However it should be apparent that a centrally located control switch is only a matter of convenience and it would be consistent with the objects of this invention if all of the valves and the pump 18 were manually and/or individually controlled.

OPERATION OF THE PREFERRED EMBODIMENT

In the operation of the test apparatus the fuel element to be tested is deposited in the sipping can 3 and the sipping can cover 4 is placed thereon. The operator then begins with an air purge of the system. The purge is accomplished with switch 41 at position I; which sets valve A closed, valve B to vent, valve D open, valve E open and the pump 18 off. The purge need only last until the system is flushed to a desired background count rate. Then, in a first step in the method of testing, switch 41 is moved to position II which closes valve E to prevent water expelled from air pocket 9 from draining back to the top of the sipping can head 4. Formation of the air pocket 9 also clears the sample line 7 of water and serves to reduce the pressure in the test chamber 1. With fission gases pulled from any defects in the fuel elements by a decrease in pressure, air bubbling around the fuel elements during the initial air purge may simultaneously entrain some fission gas. Thus, if during the initial air purge or during air pocket formation it becomes difficult to maintain a background count rate it is very probable that the fuel element being tested contains defects. However, it is generally advisable to proceed to the next step for verification. Note that the preceding steps may be accomplished without the aid of a pressurized source of purge air, if the fuel pool is no more than 30 feet deep, by having valve D open to the atmosphere rather than to air supply 33 and by operating the pump 18 as a vacuum pump. This would draw air in through valve D and expel it to the ventilation system through valve B.

In a second step in the method, the switch 41 is moved to position III, closing valve D, and turning pump 18 on, to pull a vacuum in the test chamber 1. Normally the operator should subject the fuel element being tested to a vacuum of approximately 15 inches or greater of mercury. However, if at any time during this step the count rate shows a rapid increase, fuel defects are considered verified and the operator should quickly terminate the test to minimize contamination of the system and unnecessary release of fission gas to the environment. If no significant increase in activity occurs the operator should proceed to the next step for further verification.

In a third step in the method, the switch 41 is moved to position IV; turning valve B to the test chamber, for vacuum recycle. In this step, while holding the pressure in the test chamber 1 to a vacuum of approximately 15 inches or greater of mercury, sample flow drawn from the air pocket 9 for testing is continuously recycled. Sample flow is returned to the test chamber 1 through return line 6 to gas sparger 5, which distributes the sample flow in a mass of bubbles to effect a continuous purge of released fission gases from the water surrounding the fuel element. During this portion of the test if a constant increase in count rate is observed, even if slow, the existence of a fuel defect is considered verified. Normally, if the fuel element being tested withstands 5 minutes of vacuum recycle with no appreciable increase in count rate the fuel element is considered sound, and the operator proceeds to positions V and VI of switch 41.

If at any time during the preceding steps an increase in count rate is observed that is sufficient to indicate that the fuel element being tested is defective the operator should quickly move switch 41 to position V, opening valve A, turning two-way valve B to vent, opening valve E, and leaving the pump 18 on, the purge the monitor with gas drawn from the ventilation system 31 and drain the reservoir 10. After the monitor has been purged, the operator moves switch 41 to position VI, shutting off the pump 18, so that the defective fuel element may be removed from the test chamber. After the defective fuel element is removed it is advisable that the sipping can be purged with water. This may be accomplished by connecting the quick disconnect carried by return line 6 to connection 37 and controlling the flow of water with valve C after the sipping head 4 has been removed.

It should be understood that the invention is not limited to the testing of complete assemblies of nuclear fuel elements removed from the core of a nuclear reactor. It may be used to test individual elements, selected groups of elements, or reconstituted fuel assemblies. Also, it would not be inconsistent with the objects of this invention if the testing of fuel elements was carried out in the reactor vessel itself. For example, this could be accomplished by placing the testing chamber somewhere in the vessel, or in the case of a reactor having fuel channels, such as a BWR, forming a test chamber by sealing both ends of the fuel channel with caps incorporating gas sparger and necessary exhaust and return lines. These and other modifications of the apparatus and its use may be employed by those skilled in the art without departing from the inventions, and it is intended by the appended claims to cover these and other modifications.

I claim:

1. Apparatus for detecting defective nuclear fuel elements comprising:
   a. a test chamber filled with water for individually enclosing and sealing the fuel element to be tested, said test chamber having a gas sparger disposed at the bottom of said test chamber,
   b. a reservoir connected to said test chamber for receiving water displaced from above the fuel element to effect a reduction in pressure in said test chamber and for receiving sample gas from said test chamber,
   c. a pump for drawing sample gas from said reservoir,
   d. a radiation monitor receiving sample gas from said pump, and
   e. a two-way receiving sample gas from said monitor for selectively directing said sample gas back to said test chamber through said gas sparger to displace the water above the fuel element to effect a reduction in pressure in said test chamber and to simultaneously purge the water surrounding said fuel element of any fission gases pulled therefrom, and for selectively venting said sample gas to further reduce the pressure in said test chamber to a vacuum by means of said pump and to simultaneously purge the water surrounding the fuel element of any further fission gases pulled therefrom.

2. The apparatus of claim 1 wherein said test chamber comprises:

a. a sipping can including a sipping can head,
b. a gas sparger at the bottom of said sipping can,
c. a return line connected to said gas sparger for returning sample gas from said two-way valve to said gas sparger, and
d. a drain line and a sample line connected to the top of said sipping can head leading to said reservoir.

3. The apparatus of claim 2 further including:
a. ventilation system,
b. vent line connected between said reservoir and said ventilation system, and
c. a vent valve in said vent line and a drain valve in said drain line, said valves being normally closed to seal said reservoir and prevent water displaced from said test chamber, during the purging operation, from returning to said test chamber.

4. The apparatus of claim 3 further including a gas chiller connected to receive sample gas from said reservoir and remove moisture from said sample gas for preventing the condensation of water in the rest of the test apparatus.

5. The apparatus of claim 4 including:
a. means for preventing accidental flooding of the apparatus, said means comprising a water trap for receiving sample gas from said gas chiller,
b. a spring-loaded platform having said water trap mounted thereon and switch contacts mounted on said spring loaded platform for turning said pump off and opening the valve in said vent line when said water trap fills to a predetermined level with water.

6. The apparatus of claim 5 wherein said pump is a diaphragm-type pump.

7. The apparatus of claim 6 further including: a second water trap for receiving sample gas from said pump, said radiation monitor receiving sample gas from said second water trap, said radiation monitor including amplifier-discriminator circuitry for preferentially measuring the activity of $Kr^{85}$ in the presence of $Xe^{133}$, or selectively for measuring the activity of $Kr^{85}$ and $Xe^{133}$ with equal efficiency.

8. A method for locating defective nuclear fuel elements comprising the steps of:
a. individually enclosing and sealing the fuel element to be tested in a test chamber filled with water;
b. reducing the pressure in said chamber by introducing sample gas to said chamber to displace the water above said fuel element thereby removing the pressure head due to the water above said fuel element;
c. simultaneously introducing sample gas to the bottom of said chamber for purging the water surrounding the fuel element of any fission gases pulled therefrom as a result of said reduction of pressure; and
d. simultaneously monitoring the radiological activity of sample gas from said chamber, sample gas activity indicating the presence of fission gases pulled through defects in said fuel element.

9. The method of claim 8 wherein the pressure in said test chamber is further reduced to about 15 inches of mercury vacuum, while the activity of said sample gas is monitored.

10. The method of claim 9 wherein sample gas drawn from said test chamber is recirculated to continuously purge the water surrounding said fuel element of any fission gases pulled therefrom.

11. The method of claim 10 wherein said sample gas is monitored preferentially for the presence of $Kr^{85}$ when a relatively long period of time has passed since said fuel element has been used for power generation and said sample gas is monitored preferentially or equally for the presence of $Xe^{133}$ when a relatively short period of time has passed since the fuel element has been used for power generation.

* * * * *